(12) United States Patent
Oh et al.

(10) Patent No.: US 10,210,815 B2
(45) Date of Patent: Feb. 19, 2019

(54) LIQUID CRYSTAL DISPLAY AND DIMMING CONTROL METHOD THEREOF

(71) Applicant: LG DISPLAY CO., LTD., Seoul (KR)

(72) Inventors: DaeSeok Oh, Paju-si (KR); Moonsoo Chung, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 141 days.

(21) Appl. No.: 15/333,597

(22) Filed: Oct. 25, 2016

(65) Prior Publication Data
US 2017/0124962 A1    May 4, 2017

(30) Foreign Application Priority Data

Oct. 30, 2015 (KR) .......................... 10-2015-0152680

(51) Int. Cl.
*G09G 3/36* (2006.01)
*G09G 3/34* (2006.01)
*G02F 1/1343* (2006.01)
*G02F 1/1368* (2006.01)
*G02F 1/1333* (2006.01)
*G02F 1/1335* (2006.01)

(52) U.S. Cl.
CPC ......... *G09G 3/3406* (2013.01); *G09G 3/3648* (2013.01); *G02F 1/1368* (2013.01); *G02F 1/13439* (2013.01); *G02F 1/134309* (2013.01); *G02F 2001/133302* (2013.01); *G02F 2001/133601* (2013.01); *G02F 2201/121* (2013.01); *G02F 2201/123* (2013.01); *G02F 2203/30* (2013.01); *G09G 3/3614* (2013.01); *G09G 2300/0426* (2013.01); *G09G 2310/0286* (2013.01); *G09G 2310/08* (2013.01); *G09G 2320/0247* (2013.01); *G09G 2320/0276* (2013.01); *G09G 2320/064* (2013.01); *G09G 2320/0646* (2013.01)

(58) Field of Classification Search
CPC .......... G09G 2320/064; G09G 3/3406; G09G 2320/0646; G09G 3/342; G09G 2360/16; G09G 2330/021; G09G 2320/0247; G09G 2310/0235; G09G 3/34; G09G 2330/02; G09G 3/3611; G09G 3/3648; G09G 5/10; G09G 2320/0233; G09G 2320/0626; G09G 2320/062; G09G 2320/0257
USPC ......................................................... 345/102
See application file for complete search history.

(56) References Cited

U.S. PATENT DOCUMENTS

| 7,277,079 | B2 * | 10/2007 | Kobayashi | ........... | G02B 6/0076 |
| | | | | | 345/102 |
| 8,013,830 | B2 * | 9/2011 | Hsu | ......... | G09G 3/342 |
| | | | | | 345/102 |
| 8,248,360 | B2 * | 8/2012 | Nanbu | ............... | H05B 41/3927 |
| | | | | | 345/102 |

(Continued)

*Primary Examiner* — Duc Q Dinh
(74) *Attorney, Agent, or Firm* — Dentons US LLP

(57) ABSTRACT

A dimming control method of a backlight unit of a liquid crystal display (LCD) device driven at a driving frequency (f) of 60 Hz or lower includes a first step of driving the backlight unit using a first dimming value, and a second step of driving the backlight unit using a second dimming value higher than the first dimming value. The first step and the second step are alternately repeated and a repetition number of the second step within one period T of a driving frequency (f) is set to satisfy a condition of "{(60/f)−1}". Here, f is a natural number lower than 60.

12 Claims, 7 Drawing Sheets

(56) References Cited

U.S. PATENT DOCUMENTS

2007/0268237 A1* 11/2007 Shen .................. G09G 3/342
                                                    345/102
2015/0154916 A1*  6/2015 Chen .................. G09G 3/342
                                                    345/102
2015/0310809 A1* 10/2015 Ryu .................... G09G 3/342
                                                    345/691

* cited by examiner

FIG. 5
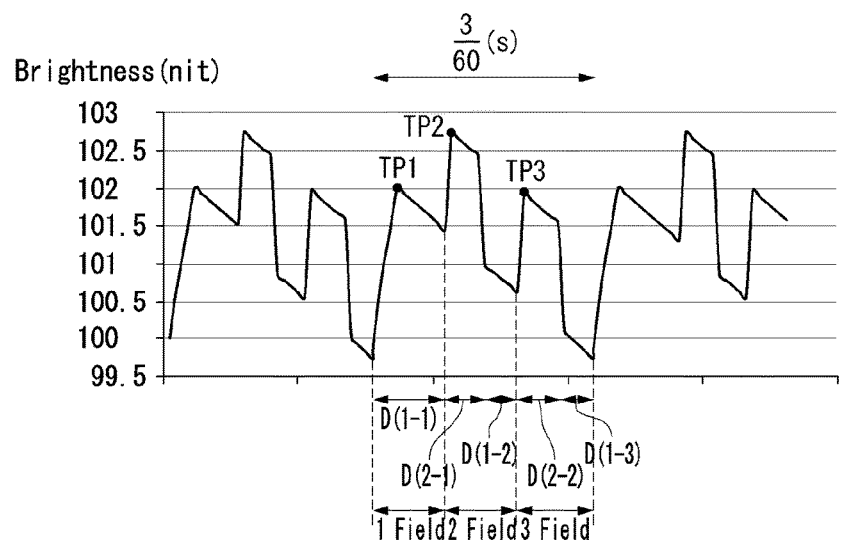
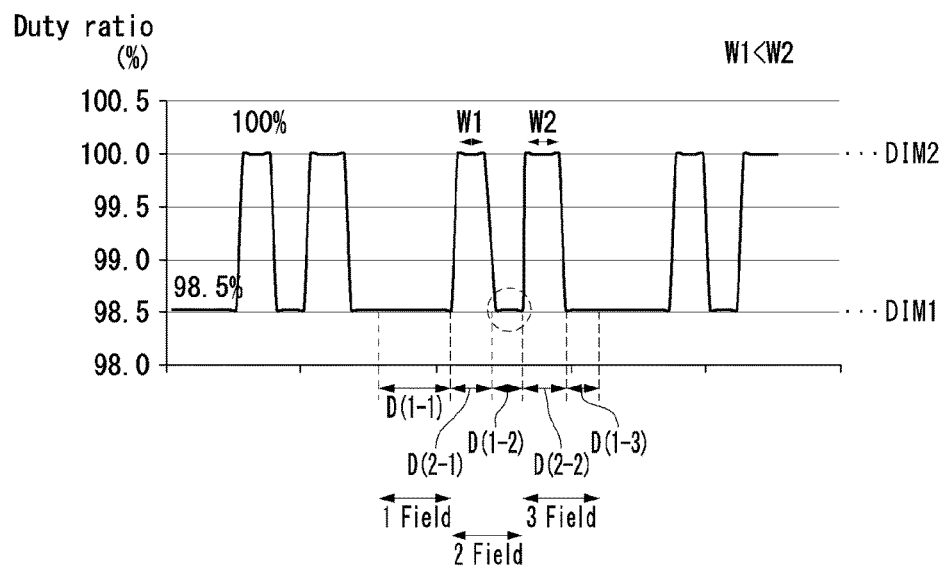

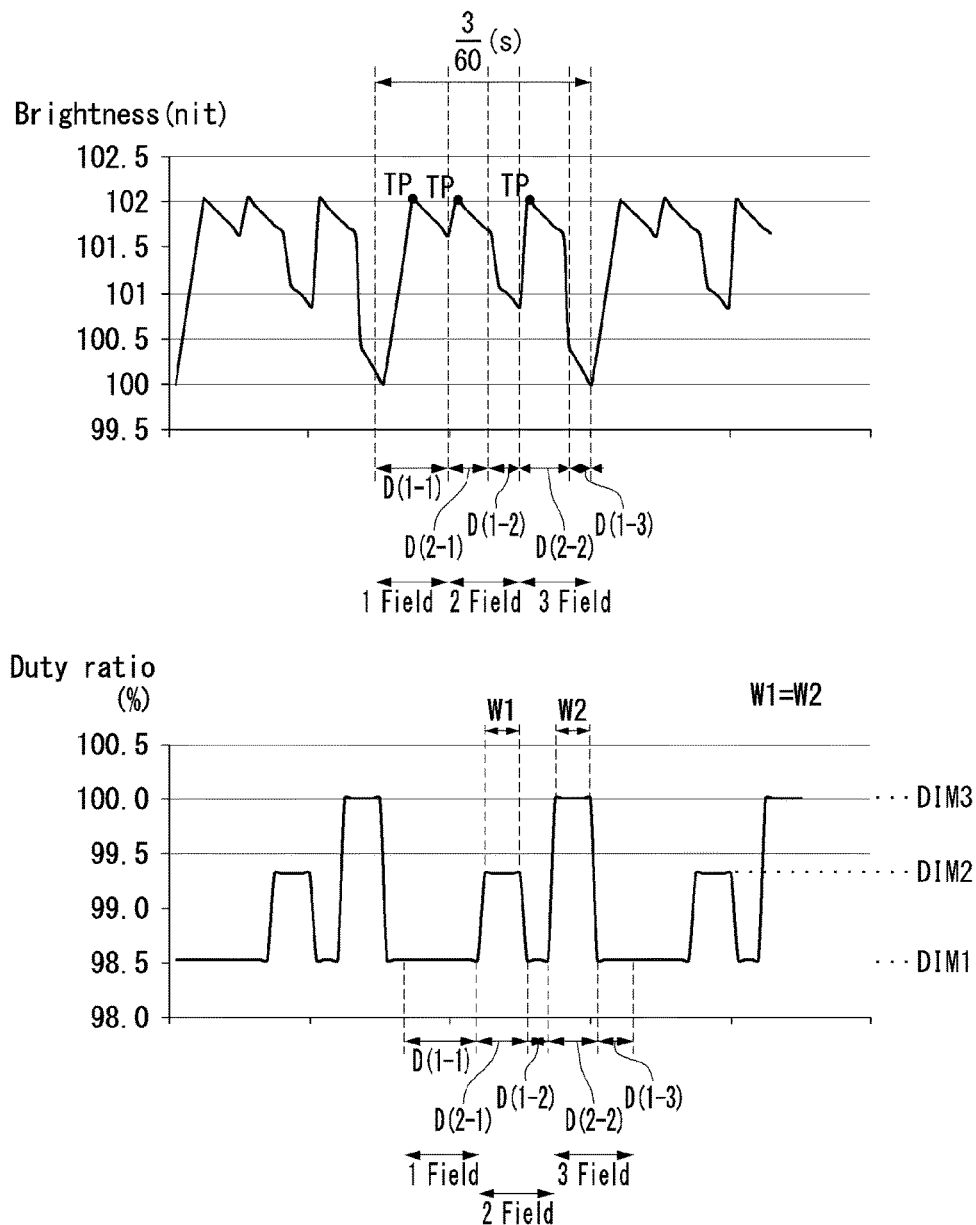

LIQUID CRYSTAL DISPLAY AND DIMMING CONTROL METHOD THEREOF

This application claims the benefit of Korea Patent Application No. 10-2015-0152680 filed on Oct. 30, 2015, the entire contents of which are incorporated herein by reference for all purposes as if fully set forth herein.

BACKGROUND

Field

The present disclosure relates to a liquid crystal display (LCD) and a dimming control method thereof.

Discussion of the Related Art

Liquid crystal displays (LCDs) have been used in portable computers such as notebook computers, office automation instruments, audio/video devices, indoor/outdoor advertisement display devices, and the like. LCD devices display an image using a thin film transistor (TFT) as a switching element. Transmissive LCDs (or backlit LCDs), which are the majority of LCDs, display an image by controlling an electric field applied to a liquid crystal layer to modulate light incident from a backlight unit.

In an LCD device, a pixel receives a data voltage in synchronization with a gate pulse and charges the same in the pixel capacitor during a scan period. Also, the pixel is designed to output brightness corresponding to the voltage charged in the pixel capacitor during the scan period throughout 1 frame period. Since the pixel receives the data voltage during its scan period in each frame period, it holds the charged data voltage during about 1 frame period. During the holding period in which the pixel maintains the charged voltage, the charged voltage in the pixel is lowered due to a leakage current, or the like, and as a result, brightness displayed by the pixel may change during the holding period.

In particular, when the driving frequency of a display panel is low, a variation in brightness during the holding period further increases. This is because the holding period is lengthened when the display panel is driven at a low frequency as illustrated in FIG. 1. For example, when driving frequency is 60 Hz, 1 frame, which includes the scan period and the holding period, corresponds to 1/60 seconds, and thus, each pixel receives its next data voltage after 1/60 seconds. However, as illustrated in FIG. 1, when driving frequency is 20 Hz, each pixel is scanned during the first field corresponding to 1/60 seconds, and then receives its next data voltage during the fourth field that is after the second and third fields corresponding to 2/60.

As a result, when a display device is driven at a low frequency, a variation of brightness during the holding period may increase, and a flicker phenomenon may also occur due to difference in brightness at the time when pixels charge their next image data.

SUMMARY

Accordingly, embodiments of the present invention are directed to a liquid crystal display (LCD) and a dimming control method thereof that substantially obviate one or more problems due to limitations and disadvantages of the related art.

An aspect of embodiments of the present invention is directed to an LCD driven at a lower frequency with reduced flicker and a dimming control method thereof.

Additional features and advantages of the present disclosure will be set forth in the description which follows, and in part will be apparent from the description, or may be learned by practice of the invention. These and other advantages of the present invention will be realized and attained by the structure particularly pointed out in the written description and claims hereof as well as the appended drawings.

To achieve these and other advantages and in accordance with the purpose of embodiments of the invention, as embodied and broadly described herein, a dimming control method of a liquid crystal display (LCD) device driven at a driving frequency (f) of 60 Hz or lower, the dimming control method may, for example, include a first step of driving a backlight unit using a first dimming value; and a second step of driving the backlight unit using a second dimming value higher than the first dimming value, wherein the first step and the second step are alternately repeated and wherein a repetition number of the second step within one period of a driving frequency is set to satisfy a condition of "$\{(60/f)-1\}$", where f is a natural number lower than 60.

In another aspect, a liquid crystal display (LCD) device may, for example, include a backlight unit irradiating light; a display panel that displays a gray level to control a transmission amount of light irradiated from the backlight unit; a timing controller that generates a timing control signal to drive the display panel at a frame frequency of 60 Hz or lower; a driving circuit unit that drives the display panel in response to the timing control signal; a dimming controller that generates first and second pulse width modulation (PWM) signals having different duty ratios to adjust a dimming value of the backlight unit; and a light source driver that drives the backlight unit by a first dimming value in response to the first PWM signal and drives the backlight unit by a second dimming value in response to the second PWM signal, wherein the dimming controller outputs the second PWM signal "$\{(60/f)-1\}$" times within one period of the frame frequency, wherein f is a natural number lower than 60.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 5 is a view illustrating backlight dimming control and brightness variations according to a first embodiment;

FIG. 7 is a view illustrating backlight dimming control and brightness variations according to a second embodiment.

DETAILED DESCRIPTION OF THE ILLUSTRATED EMBODIMENTS

Figure 1:
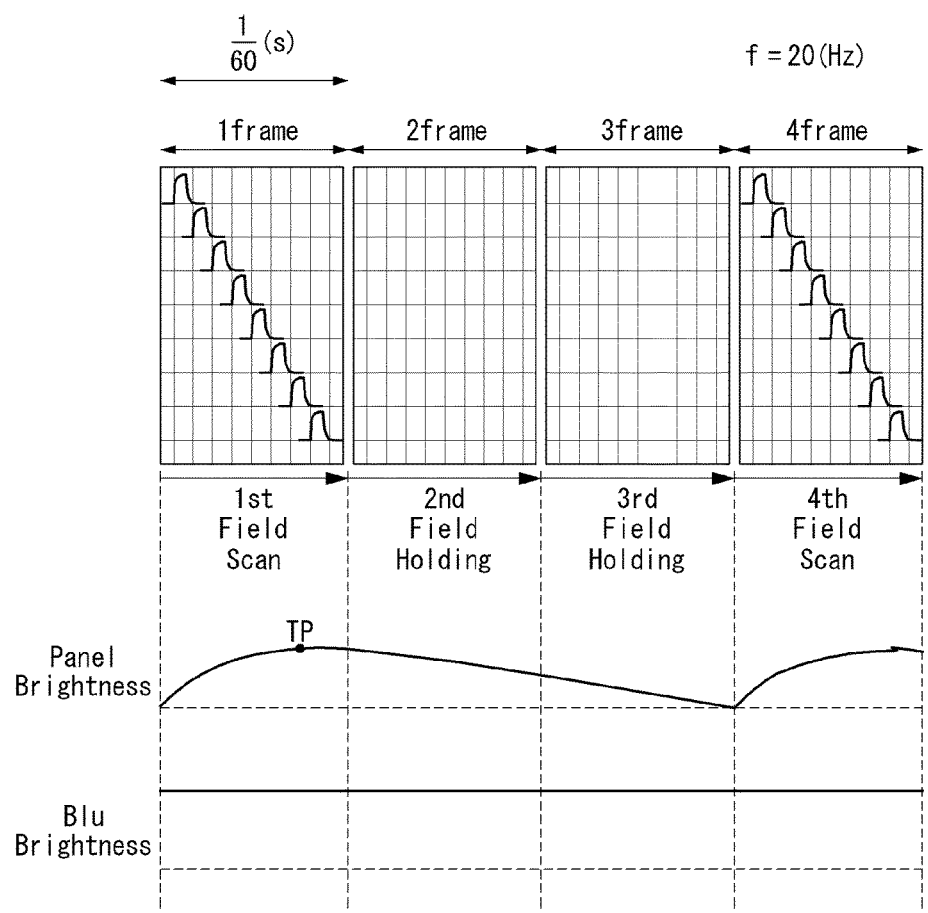
FIG. 1 is a view illustrating a change in brightness of a display panel according to low frequency driving in the related art.

Hereinafter, embodiments of the present disclosure will be described in detail with reference to the accompanying drawings. Like reference numerals refer to like elements throughout. In the following description, if a detailed explanation for a related known function or construction is considered to unnecessarily divert the gist of the present invention, such explanation will be omitted but would be understood by those skilled in the art.

Figure 2:
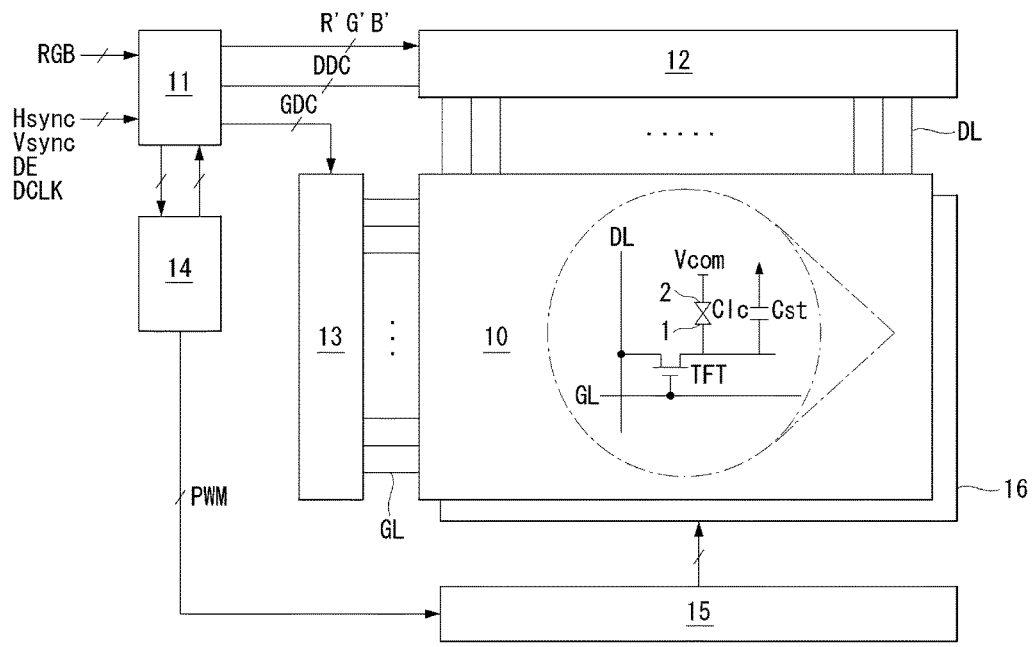
FIG. 2 is a view illustrating a liquid crystal display (LCD) device according to an embodiment of the present disclosure.

FIG. 2 is a view illustrating a liquid crystal display (LCD) device according to an embodiment of the present disclosure.

Referring to FIG. 2, an LCD device according to an embodiment of the present disclosure includes a display panel 10, a timing controller 11, a source driver 12, a gate driver 13, a dimming control circuit 14, a light source driver 15, and a backlight unit 16.

The display panel 10 includes two glass substrates and a liquid crystal layer formed therebetween. In a lower glass substrate of the display panel 10, a plurality of data lines DL and a plurality of gate lines GL intersect with each other. As the data lines DL and the gate lines GL intersect with each other, liquid crystal cells Clc are disposed in a matrix form in the display panel 10. Each of the liquid crystal cells Clc includes a thin film transistor (TFT), a pixel electrode 1 connected to the TFT, a storage capacitor Cst, and the like.

A black matrix, a color filter, and a common electrode 2 are formed on an upper glass substrate of the display panel 10. A common electrode 2 is formed on the upper glass substrate in a vertical field driving mode such as a twisted nematic (TN) mode and a vertical alignment (VA) mode, and formed on the lower glass substrate together with a pixel electrode 1 in an in-plane field driving mode such as an in-plane switching (IPS) mode and a fringe field switching (FFS) Mode. The liquid crystal cells Clc include R liquid crystal cells for displaying red color, G liquid crystal cells for displaying green color, and B liquid crystal cells for displaying blue color. An R liquid crystal cell, a G liquid crystal cell, and a B liquid crystal cell form a unit pixel for implementing a color. A polarizer is attached to each of the upper glass substrate and the lower glass substrate, and an alignment film is formed on an inner surface in contact with liquid crystal to set a pretilt angle of liquid crystal.

The timing controller 11 supplies digital image data RGB input from a system board on which an external video source is mounted to the dimming control circuit 14, and supplies modulation data R'G'B' modulated by the dimming control circuit 14 to the source driver 12. The timing controller 11 generates timing control signals DDC and GDC for controlling operating timing of the source driver 12 and the gate driver 13 on the basis of timing signals Vsync, Hsync, DE, and DCLK from the system board.

The timing controller 11 skips one or more frames at a predetermined interval, among frames of an input image signal input at a frame frequency of 60 Hz, to perform a low frequency driving. For example, in order to perform a low frequency driving at an "f" (f is a natural number of 60 or smaller) frequency, the timing controller 11 selects one of continuous "60/f" number of frames to display an image and skips an input image frame of "(60/f)−1". The frame frequency f refers to a rate at which image data is updated per second. For example, when image data is updated 60 times per second, the frame rate is 60 Hz, and when image data is updated once per second, the frame rate is 1 Hz. Here, updating image data may also refer to the number of charging a data voltage in each pixel.

The source driver 12 includes a plurality of data drive integrated circuits. The data drive integrated circuits include a shift register for sampling a clock signal, a register for temporarily storing modulated data R'G'B' of an input image, a latch for storing data by one line each time in response to a clock signal from the shift register and simultaneously outputting the stored data of one line, a digital-to-analog converter (DAC) for selecting a positive polarity/negative polarity gamma voltage with reference to a gamma reference voltage in response to a data value from the latch, a multiplexer for selecting a data line DL to which the analog data converted by the positive polarity/negative polarity gamma voltage is supplied, and an output buffer connected between the multiplexer and the data line DL. The source driver 12 latches the modulated data R'G'B' according to the data timing control signal DDC from the timing controller 11, converts the latched, modulated data R'G'B' into a positive polarity/negative polarity analog data voltage using a positive polarity/negative polarity gamma compensation voltage, and supplies the converted positive polarity/negative polarity analog data voltage to the data line DL.

The gate driver 13 includes a plurality of gate drive integrated circuits. The gate drive integrated circuits include a shift register, a level shifter for converting an output signal from the shift register into a swing width appropriate for TFT driving of a liquid crystal cell, an output buffer, and the like. The gate driver 13 sequentially outputs a scan pulse (or a gate pulse) according to the gate timing control signal GDC from the timing controller 11 and supplies the same to the gate lines GL to select a pixel line to which data voltages are to be charged.

The dimming control circuit 14 applies a pulse width modulation (PWM) signal for controlling the backlight unit 16 to the light source driver 15. The dimming control circuit 14 provides first to third PWM signals having different pulse width duty ratios to the light source driver 15. A specific operation of the dimming control circuit 14 will be described hereinafter.

The light source driver 15 drives light sources on the basis of a duty ratio of the PWM signal input from the dimming control circuit 14.

The backlight unit 16 includes a plurality of light sources and divides a surface light source irradiated to the display panel 10 into a plurality of blocks in a matrix. The backlight unit 16 may be implemented as any one of a direct type backlight unit and an edge type backlight unit. The direct type backlight unit has a structure in which a plurality of optical sheets and a diffuser are stacked below the display panel 10 and a plurality of light sources are disposed below the diffuser. The edge type backlight unit has a structure in which a plurality of optical sheets and a light guide plate are stacked below the display panel 10 and a plurality of light sources are disposed on the side of the light guide plate. The light sources may be implemented as point sources.

Figure 3:
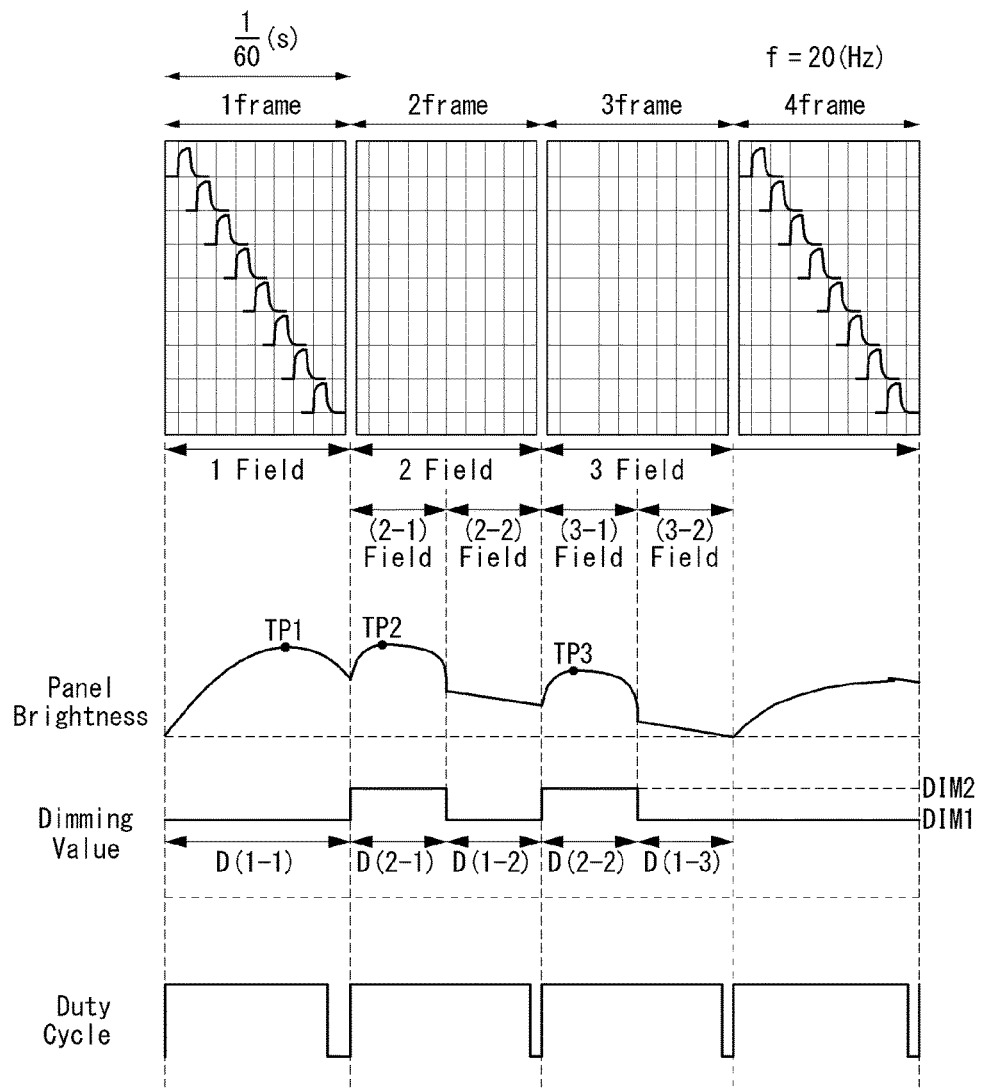
FIG. 3 is a view illustrating backlight dimming control and brightness variations according to an embodiment of the present disclosure.

FIG. 3 is a view illustrating a change in brightness of a backlight unit by a dimming controller and a change in brightness of a panel based on the change in brightness of the backlight unit. FIG. 3 illustrates an embodiment in which a timing controller drives a display panel at a frame frequency of 20 Hz upon receiving an input image frame of 60 Hz. In embodiments described hereinafter, a configuration in which the dimming controller 14 sets a dimming value to control the backlight unit 16 means that the dimming controller 14 outputs a PWM signal in response to each dimming value by way of example.

The timing controller 11 skips several input image frames at a predetermined interval in order to drive an input image having a frame frequency of 60 Hz, at a frame frequency of 20 Hz. Skipping the input image frame means that a data voltage corresponding to the image data of a skipped frame is not charged in the pixel. When an input image has 60 Hz, the timing controller 11 skips two continuous frames in order to drive the display panel 10 at a frame frequency (f) of 20 Hz. For example, for an image frame input at a frame frequency of 60 Hz, the timing controller 11 may write input image data of a (3k−2) (k is a natural number) frame into pixels and skip a (3k−1) frame and a 3 k frame. Hereinafter, an embodiment of the present disclosure will be described based on first to third frames when k is 1, and each image frame will be expressed as a first field (1field) or a third field (3field).

A method for controlling the backlight unit 16 by the dimming control circuit 14 includes a first step (D1) of using a first dimming value DIM1 and a second step D2 of using a second dimming value. The first step D1 and the second step D2 are alternately repeated. The first step includes (1-1) step (D[1-1]) and a (1-2) step (D[1-2]) performed between every second steps D2 within one period of input image data. Since a frame frequency of the input image data is 60 Hz, one period T of the input image data is 1/60 (sec.)

The second step D2 is performed once in every field, and in particular, the second step D2 is performed at an initial section of each field. As a result, a second field 2 field includes (2-1) step for driving the backlight unit 16 using a second dimming value DIM2 and (1-2) step for driving the backlight unit 16 using a first dimming value DIM1.

The dimming control circuit 14 differentiates dimming values of the backlight unit 16 in a predetermined section within the second field 2field and the third field 3field. The dimming control circuit 14 controls the backlight unit 16 using the first dimming value DIM1 in the first field 1field and alternately uses the second dimming value DIM2 and the first dimming value DIM1 in the second field 2field and the third field 3field.

The dimming control circuit 14 controls the backlight unit 16 using the second dimming value DIM2 in the 2-1 section (D[2-1]), and controls the backlight unit 16 using the first dimming value DIM1 in a 1-2 section (D[1-2]). Similarly, the dimming control circuit 14 controls the backlight unit 16 using the second dimming value in 2-2 section (D[2-2]) and controls the backlight unit 16 using the first dimming value DIM1 in a 1-3 section (D [1-3]). In this manner, since the dimming control circuit 14 drives the backlight unit 16 using the second dimming value DIM2 in each field, excluding the first field 1field, the same brightness point of inflection as that when the display panel 10 is driven using the frame frequency of 60 Hz is designed to output.

Figure 4:
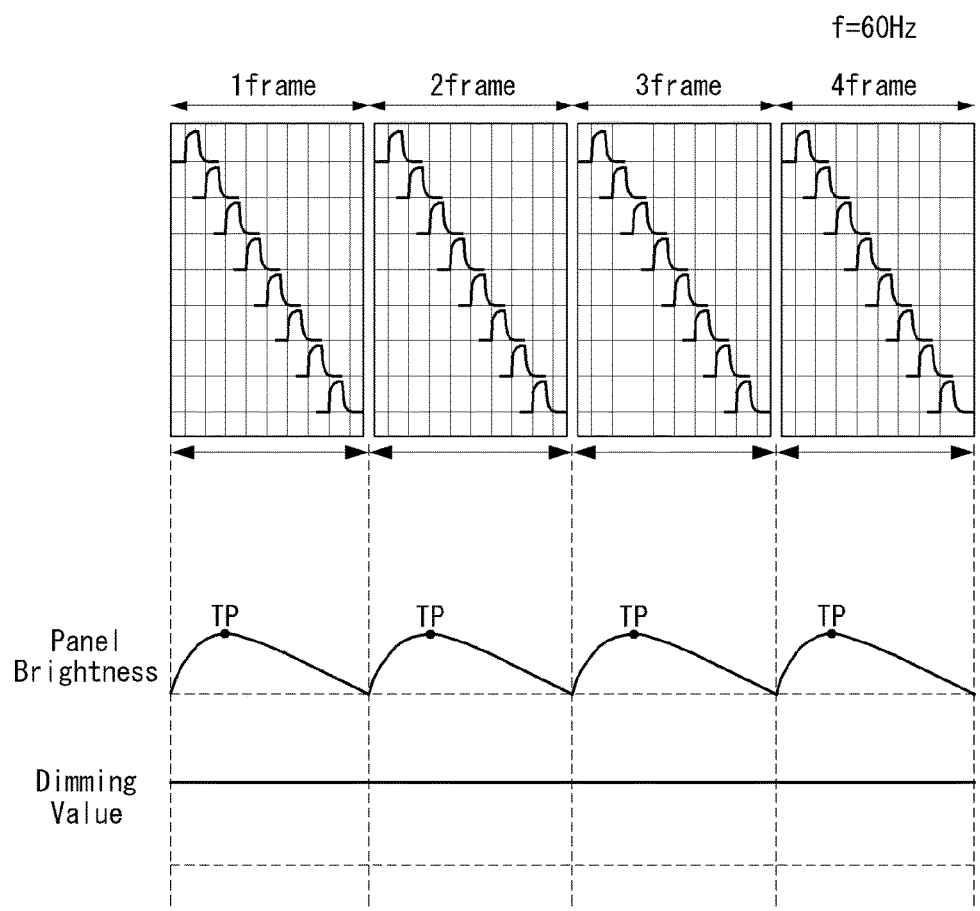
FIG. 4 is a view illustrating backlight dimming control and brightness variations according to comparative example.

Referring to FIG. 4, when the display panel 10 is driven at a typical frame frequency of 60 Hz, pixels charge data in each frame, and after a predetermined period of time, the highest brightness is displayed, and thereafter, the brightness is lowered during the remaining period of the frame. That is, in a graph illustrating a change in brightness of pixels, a brightness point of inflection TP at which the brightness has been once increased to its highest decreases at each frame. In case of 60 Hz driving, one frame is 1/60 (sec.), and as a result, the brightness point of inflection TP appears at every 1/60 seconds, as illustrated in FIG. 4.

Also, as illustrated in FIG. 1, in a case in which a dimming value is uniform at a low frequency driving of 20 Hz, brightness of each pixel displayed on the display panel 10 has a peak brightness within the first field 1field. Thereafter, the brightness decreases until one frame terminates. That is, the brightness point of inflection TP of a pixel exists once within one frame. However, as illustrated in FIG. 3, according to an embodiment of the present disclosure, even at a low frequency driving of 20 Hz, a dimming value of the backlight unit 16 varies such that the brightness point of inflection TP appears in every field. As a result, a user may recognize the same change in brightness as in the case of driving at a frame frequency of 60 Hz, and may recognize less flicker.

A relationship between frame frequencies and flicker weighting factors based on VESA standard is shown in Table 1 below.

TABLE 1

| Frequency: Hz | Scaling Db | Scaling factor |
|---|---|---|
| 20 | 0 | 10 |
| 30 | −3 | 0.708 |
| 40 | −6 | 0.501 |
| 50 | −12 | 0.251 |
| ≥60 | −40 | 0.010 |

In Table 1, the term "Scaling" indicates the user's sensitivity to flicker, and it means that as the sensitivity increases, the stronger the user feels flicker. Also, the user recognizes an amount of flicker by multiplying the weighting factor to the flicker sensitivity. For example, the weighting value is in inverse proportion to a frequency. For example, when the weighting factor at the time of 20 Hz is "1", the weighting factor is "0.010" in case of 60 Hz. That is, in spite of a gray level difference having the same magnitude, when a driving frequency is 60 Hz, the user recognizes flicker by 1%, compared with a case in which a driving frequency is 20 Hz. In particular, as illustrated in Table 1, when the driving frequency is 60 Hz or higher, a level at which the user recognizes flicker is significantly reduced.

FIG. 3 illustrates an embodiment in which image frames having a frame frequency of 60 Hz are driven at a frame frequency of 20 Hz. The timing controller 11 may vary a frame frequency for a low frequency driving, and set a frequency frame lower than 20 Hz. If the timing controller 11 sets a frame frequency to a frequency lower than 20 Hz, more image frames, among input image frames of 60 Hz, may be skipped and more input image frames are included in 1 period T. That is, the number of fields included in one period T of the input image frame frequency is increased. For example, when n number of fields are included in 1/60 (sec.), 1 period, the dimming control circuit drives the backlight unit 16 using the first dimming value DIM1 in the first field 1field, and drives the backlight unit 16 by alternately using the second dimming value DIM2 and the first dimming value DIM1 in the second field 2field to nth field. As a result, in the driving step of the backlight unit 16, the second field may include 2-1 field (D[2-1]) as first second step and 1-2 field (D[1-2]) as a second first step, and similarly, the n field may include 2−(n−1) field as (n−1)th second step and n field as an nth first step. A period of the image frames having the frame frequency of 60 Hz is 1/60 (sec.).

In contrast, in case of a low frequency driving in which a frame frequency is "f", a period T of the frame frequency of "f" is 1/f (sec.). That is, when the image frames having the frame frequency of 60 Hz are driven at a frame frequency of "f", 60/f number of fields are included in 1 period T. As described above, one field designates a period of one frame in driving of a frame frequency of 60 Hz. Thus, when the number of fields within one period T of the frame frequency "f" is n, the second step using the first dimming value DIM1 and the second step using the second dimming value DIM2 are repeated (n−1) times. This is because the second dimming value DIM2 is used from the second field 2field. As a result, when driving is performed at the frame frequency of "f", the second step is performed "(60/f)−1" times within one period t. The number of performing the second step within the one period T is equal to the number of brightness point of inflection.

Accordingly, an embodiment of the present disclosure sets a repetition number of the second step for driving the backlight unit 16 using the second dimming value DIM2, to "(60/f)−1" times within one period T of the frame frequency (f). Also, setting the repetition number of the second step to "(60/f)−1" is to make a period of one field correspond to the frame frequency of 60 Hz. In order to lower a flicker weighting factor, a frame frequency may be increased, and thus, a period of one field may be set to correspond to a frame period in which a frame frequency is 60 Hz or higher. For example, in order to set a frame frequency to correspond to a frame period in which one field is driven at a frame frequency of 240 Hz, the repetition number of the second step may be set to "(240/f)−1".

Hereinafter, a specific example of an embodiment of the present disclosure will be described.

FIG. 5 is a timing diagram illustrating a change in duty ratio for a dimming control circuit to control a dimming value and a view illustrating a brightness variation of a display panel based on the timing diagram.

Referring to FIG. 5, the dimming control circuit 14 drives the backlight unit 16 using the first dimming value DIM1 during the first field 1field and drives the backlight unit 16 using the second dimming value DIM2 and the third dimming value DIMS during the second field 2field and the third field 3field.

The second dimming value DIM2 may be set to have a duty ratio higher than that of the first dimming value DIM1. The second dimming value DIM2 may be set to have a value great enough for the user to recognize a difference between brightness when the backlight unit 16 is driven using the first dimming value DIM1 and brightness when the backlight unit 16 is driven using the second dimming value DIM2. For example, the first dimming value DIM1 may use a duty ratio of 98% or so. The second dimming value DIM2 may use a duty ratio higher than that of the first dimming value DIM1, for example, a duty ratio of 100%.

The dimming control circuit 14 uses only the first dimming value DIM1 in the first field 1field, because brightness of pixels changes due to a leakage current, or the like, to naturally cause a point of inflection once.

In the second field 2field, the 2-1 section (D[2-1]) in which the backlight unit 16 is driven with the second dimming value DIM2 and the 1-2 section (D[1-2]) in which the backlight unit 16 is driven with the first dimming value DIM1 may be set to be the same. That is, in a case in which one field has a frame frequency of 60 Hz, the 2-1 section (D[2-1]) and the 1-2 section (D[1-2]) may be set to 8.3 ms.

A period in which the backlight unit 16 is driven using the second dimming value DIM2 in the third field 3field may be longer than a period in which the backlight unit 16 is driven using the second dimming value DIM2 in the second field 2field. As can be seen from the change in brightness illustrated in FIG. 5, the brightness of an 2-2 section (D[2-2]) using the second dimming value DIM2 in the third field 3field is lower than the brightness of the 2-1 section (D[2-1]) using the second dimming value in the second field 2field. Thus, in order to increase the brightness of brightness point of inflection TP in the third field 3field, the 2-2 section (D[2-2]) is set to be longer than the 2-1 section (D[2-1]). Here, increasing the brightness of the brightness point of inflection TP in the third field 3field is to allow the user to recognize a brightness variation, not for overall brightness compensation of the display panel.

Figure 6:
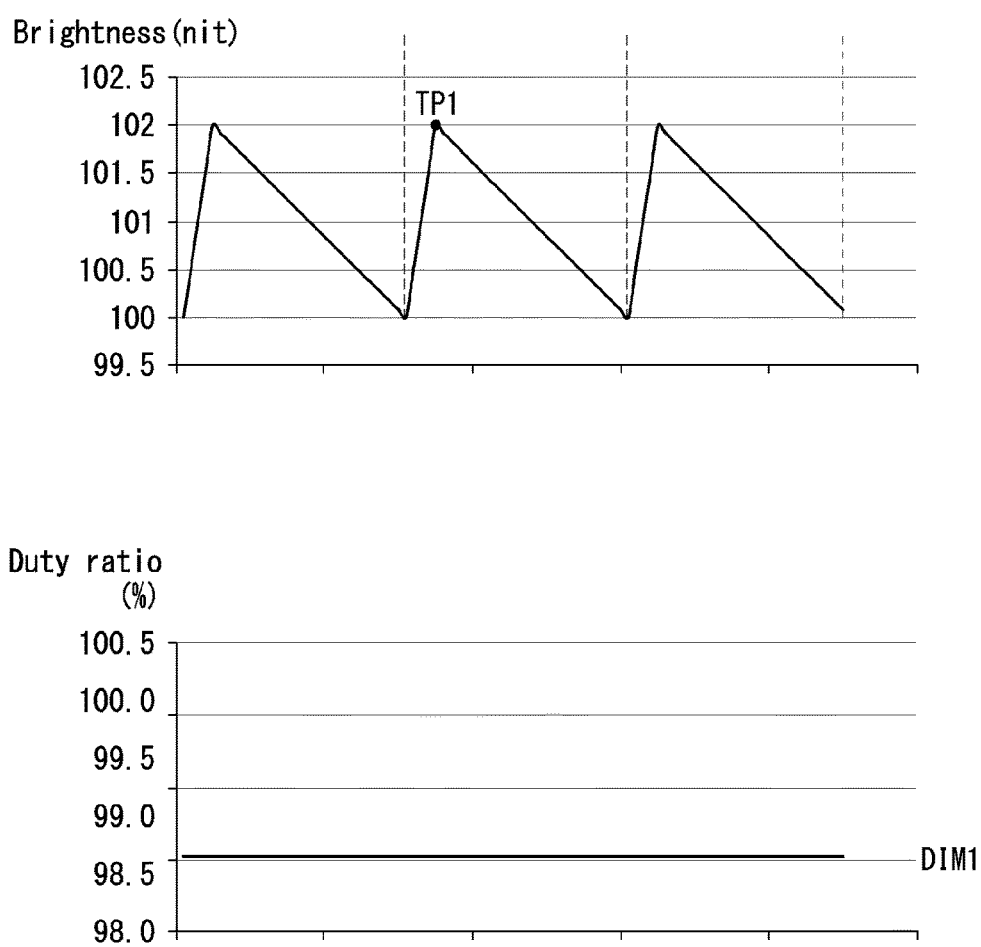
FIG. 6 is a view illustrating backlight dimming control and brightness variations based on low frequency driving according to comparative example.

Referring to FIG. 5 (an embodiment of the present disclosure) and FIG. 6 (a comparative example), the brightness of the display panel at a time when the period T of the frame frequency of 20 Hz terminates is the same. This is because changes in brightness of pixels are the same during a data voltage holding period and the backlight unit 16 is driven using the same dimming value at a time when the final field 3field terminates.

FIG. 7 is a timing diagram illustrating a change in duty ratio for the dimming control circuit to control a dimming value according to a second embodiment and a view illustrating a brightness variation of a display panel based on the timing diagram.

Referring to FIG. 7, the dimming control circuit 14 drives the backlight unit 16 using the first dimming value DIM1 during the first field 1field. Also, the dimming control circuit 14 drives the backlight unit 16 using the first dimming value DIM1 to the third dimming value DIM3 during the second field 2field and the third field 3field.

The second dimming value DIM2 has a duty ratio set to be higher than that of the first dimming value DIM1, and the third dimming value DIM3 has a duty ratio set to be higher than that of the first dimming value DIM1. For example, the first dimming value DIM1 may use a duty ratio of 98% or so. The second dimming value DIM2 may use a duty ratio higher than that of the first dimming value DIM1, for example, a duty ratio of 100%.

In the embodiment described above, the brightness of the 2-2 section (D[2-2]) using the second dimming value DIM2 in the third field 3field is lower than the brightness of the 2-1 section (D[2-1]) using the second dimming value DIM2 in the second field 2field. Thus, in order to increase the brightness of the brightness point of inflection TP in the third field 3field, the third dimming value DIM3 used in the 2-2 section (D[2-2]) may use a duty ratio higher than that of the second dimming value DIM2 used in the 2-1 section (D[2-1]).

As described above, even when driving is performed at a low frame frequency, a brightness variation remains at a level of a high frame frequency, and thus, flicker may not be easily recognized by the user due to a lowered flicker weighting factor.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A dimming control method of a liquid crystal display (LCD) device driven at a driving frequency (f) of 60 Hz or lower, the dimming control method comprising:
a first step of driving a backlight unit using a first dimming value; and
a second step of driving the backlight unit using a second dimming value higher than the first dimming value,
wherein the first step and the second step are alternately repeated and
wherein a repetition number of the second step within one period of a driving frequency is set to satisfy a condition of "$\{(60/f)-1\}$", where f is a natural number lower than 60, and
wherein the first step further comprises writing an image data, and the second step further comprises skipping an input image.

2. The dimming control method of claim 1, wherein the first step comprises:
a (1-1) step of driving the backlight unit with the first dimming value from a start point of one period to a start point of a first second step; and
a (1-2) step of driving the backlight unit with the first dimming value at each time between the second steps,
wherein the (1-2) steps are performed during the same period.

3. The dimming control method of claim 2, wherein the second step comprises:
a (2-1) step of controlling the backlight unit with the second dimming value immediately after the (1-1) step; and
a (2-2) step of controlling the backlight unit with the second dimming value after a first (1-2) step,
wherein a period of the (2-1) step is set to 75% to 90% of a period of the (2-2) step.

4. The dimming control method of claim 2, wherein the second step comprises:
a (2-1) step of controlling the backlight unit with a (2-1) dimming value immediately after the (1-1) step; and
a (2-2) step of controlling the backlight unit with a (2-2) dimming value greater than the (2-1) dimming value after the first (1-2) step,
wherein the (2-1) step and the (2-2) step are set to have the same period, and the (2-1) dimming value is set to be greater than the first dimming value and smaller than the (2-2) dimming value.

5. The dimming control method of claim 1, wherein a sum of the period in which the first step is performed and the period in which the (1-2) step is performed is within a range of $1/240$ seconds to $1/60$ seconds.

6. A liquid crystal display (LCD) device comprising:
a backlight unit irradiating light;
a display panel that displays a gray level to control a transmission amount of light irradiated from the backlight unit;
a timing controller that generates a timing control signal to drive the display panel based on first to (60/f) fields as one period at a frame frequency of 60 Hz or lower;
a driving circuit unit that drives the display panel in response to the timing control signal;
a dimming controller that generates first pulse width modulation (PWM) signals during a first field, and alternately outputs the second PWM signal and the first PWM signal during a second field; and
a light source driver that drives the backlight unit by a first dimming value in response to the first PWM signal and drives the backlight unit by a second dimming value set to have a duty ratio higher than that of the first dimming value in response to the second PWM signal,
wherein the dimming controller outputs the second PWM signal "$\{(60/f)-1\}$" times within one period of the frame frequency, wherein f is a natural number lower than 60, and
wherein the timing controller writes an image data during the first field and skips an input image during a second field to the (60/f) field.

7. The LCD device of claim 6, wherein the dimming controller sets a period in which the second PWM signal is output in the second field, to be longer than a period in which the second PWM signal is output in a third field.

8. The LCD device of claim 6, wherein the dimming controller alternately outputs a third PWM signal and the first PWM signal in a third field, and sets a duty ratio of the third PWM signal to be higher than a duty ratio of the second PWM signal.

9. The LCD device of claim 6, wherein the second dimming value set to have a value great enough for the user to recognize a difference between brightness when the backlight unit is driven using the first dimming value and brightness when the backlight unit is driven using the second dimming value.

10. The LCD device of claim 6, wherein the dimming controller drives the backlight unit using the first dimming value in the first field, and drives the backlight unit using a second dimming value and the first dimming value in the second field to nth field.

11. A dimming control method of a liquid crystal display (LCD) device comprising:
driving a backlight unit using a first dimming value during a first field,
writing an image data during the first field,
driving the backlight unit using a second dimming value higher than the first dimming value during a first duration of a second field,
driving the backlight unit using the first dimming value during a second duration of the second field, and
skipping an input image during the second field.

12. A liquid crystal display (LCD) device comprising:
a backlight unit irradiating light;
a display panel that displays a gray level to control a transmission amount of light irradiated from the backlight unit;
a timing controller that generates a timing control signal to drive the display panel based on first to (60/f) fields as one period;
a driving circuit unit that drives the display panel in response to the timing control signal;
a dimming controller that generates first pulse width modulation (PWM) signals during a first field, and alternately outputs the second PWM signal and the first PWM signal during a second field; and
a light source driver that drives the backlight unit by a first dimming value in response to the first PWM signal and drives the backlight unit by a second dimming value set to have a duty ratio higher than that of the first dimming value in response to the second PWM signal, and
wherein the timing controller writes an image data during the first field and skips an input image during a second field.

* * * * *